A. MILL.
TUBE MACHINE.
APPLICATION FILED SEPT. 22, 1905.

923,552.

Patented June 1, 1909.
9 SHEETS—SHEET 1.

Fig. 1.

A. MILL.
TUBE MACHINE.
APPLICATION FILED SEPT. 22, 1905.

923,552.

Patented June 1, 1909.
9 SHEETS—SHEET 2.

A. MILL.
TUBE MACHINE.
APPLICATION FILED SEPT. 22, 1905.

923,552.

Patented June 1, 1909.
9 SHEETS—SHEET 6.

Witnesses
Inventor:
Anton Mill

UNITED STATES PATENT OFFICE.

ANTON MILL, OF CINCINNATI, OHIO, ASSIGNOR TO THE PETERS CARTRIDGE COMPANY, OF CINCINNATI, OHIO, A CORPORATION OF OHIO.

TUBE-MACHINE.

No. 923,552.   Specification of Letters Patent.   Patented June 1, 1909.

Application filed September 22, 1905. Serial No. 279,657.

*To all whom it may concern:*

Be it known that I, ANTON MILL, a citizen of the United States, residing at Cincinnati, in the county of Hamilton and State of Ohio, have invented certain new and useful Improvements in Tube-Machines, of which the following is a full, correct, and exact specification.

This invention relates in general to tube machines, but more especially to the class of machines designed to cut tubes into desired lengths.

The invention consists in certain features of novelty in the construction, combination and arrangement of parts hereinafter fully set forth and claimed, and shown in the accompanying drawings illustrating an example of the invention.

In the said drawings.

Figure 1:
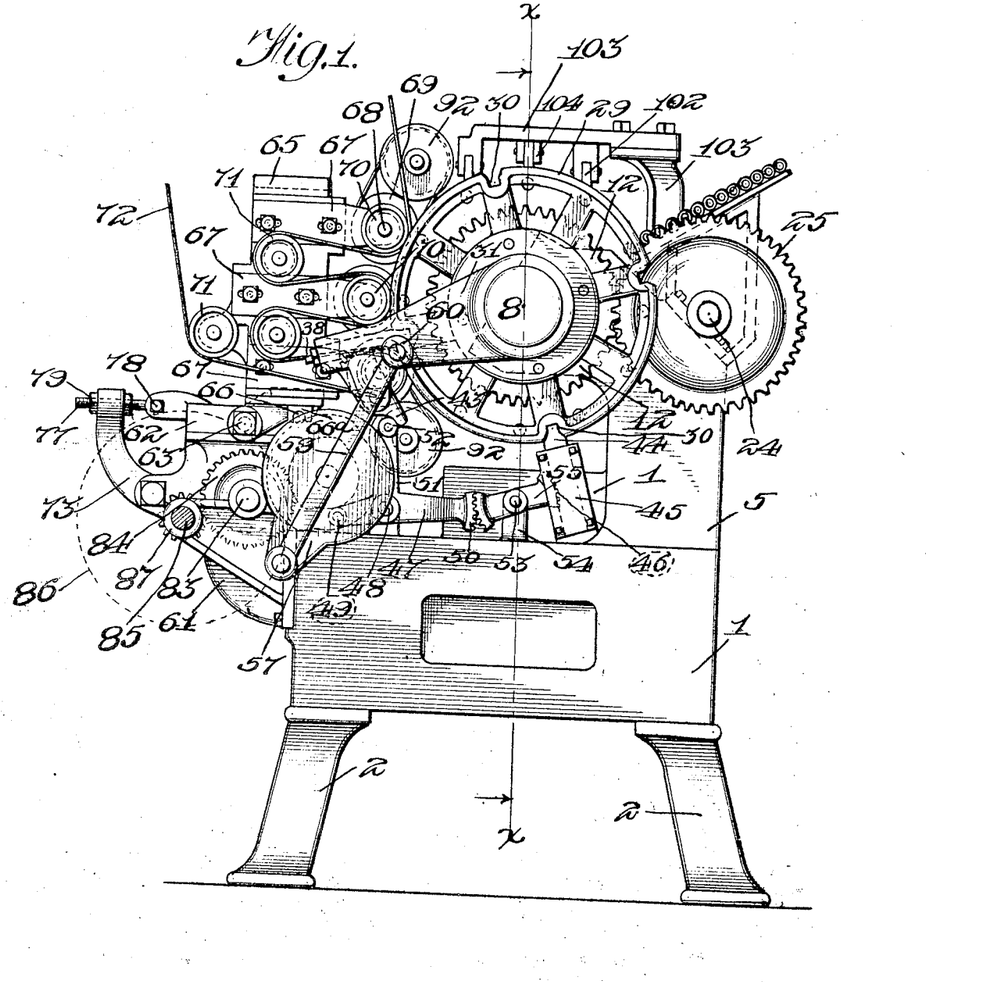
—Figure 1 is a side elevation of the machine.
Figure 2:
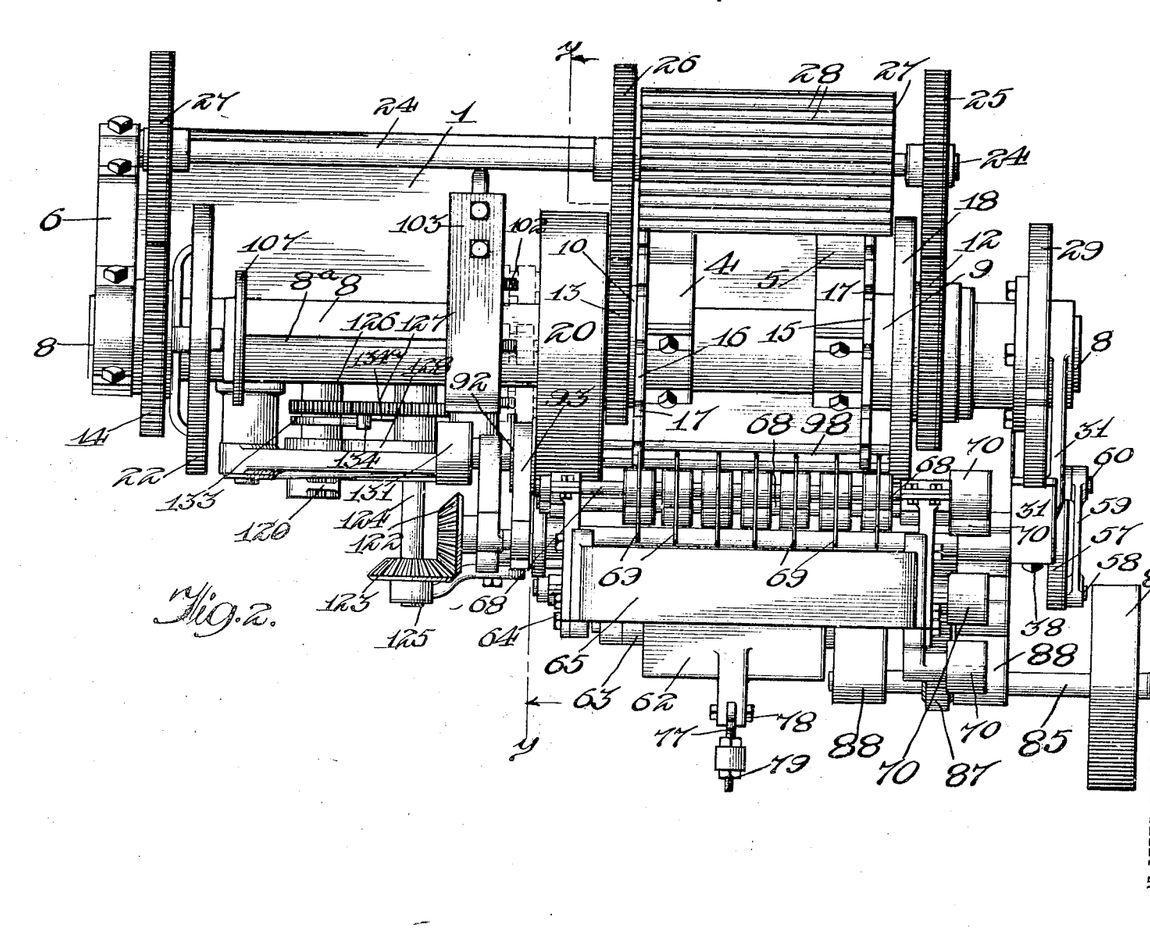
Fig. 2 is a top plan view.
Figure 3:
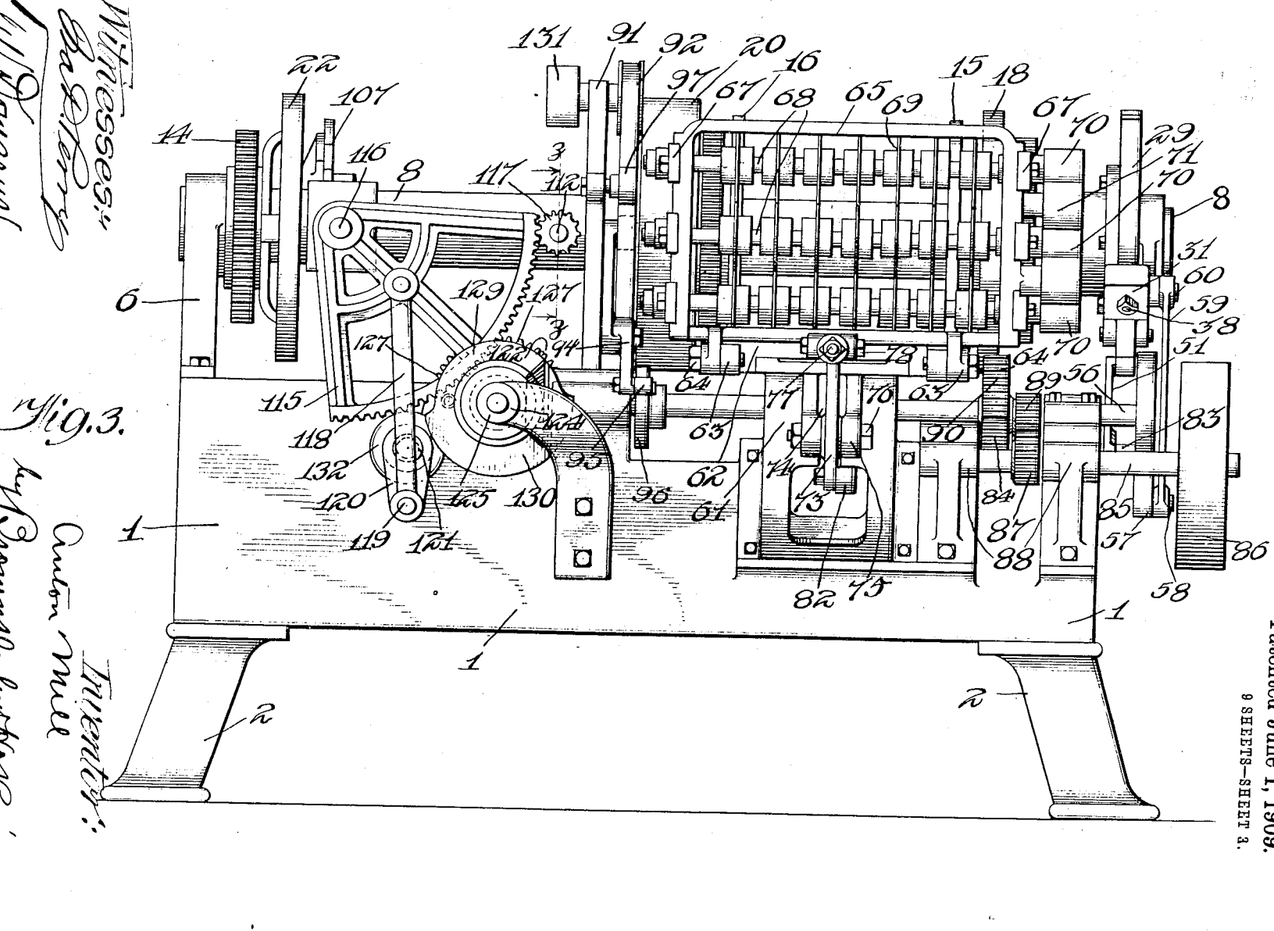
Fig. 3 is a rear view showing the cutting mechanism.
Figure 4:
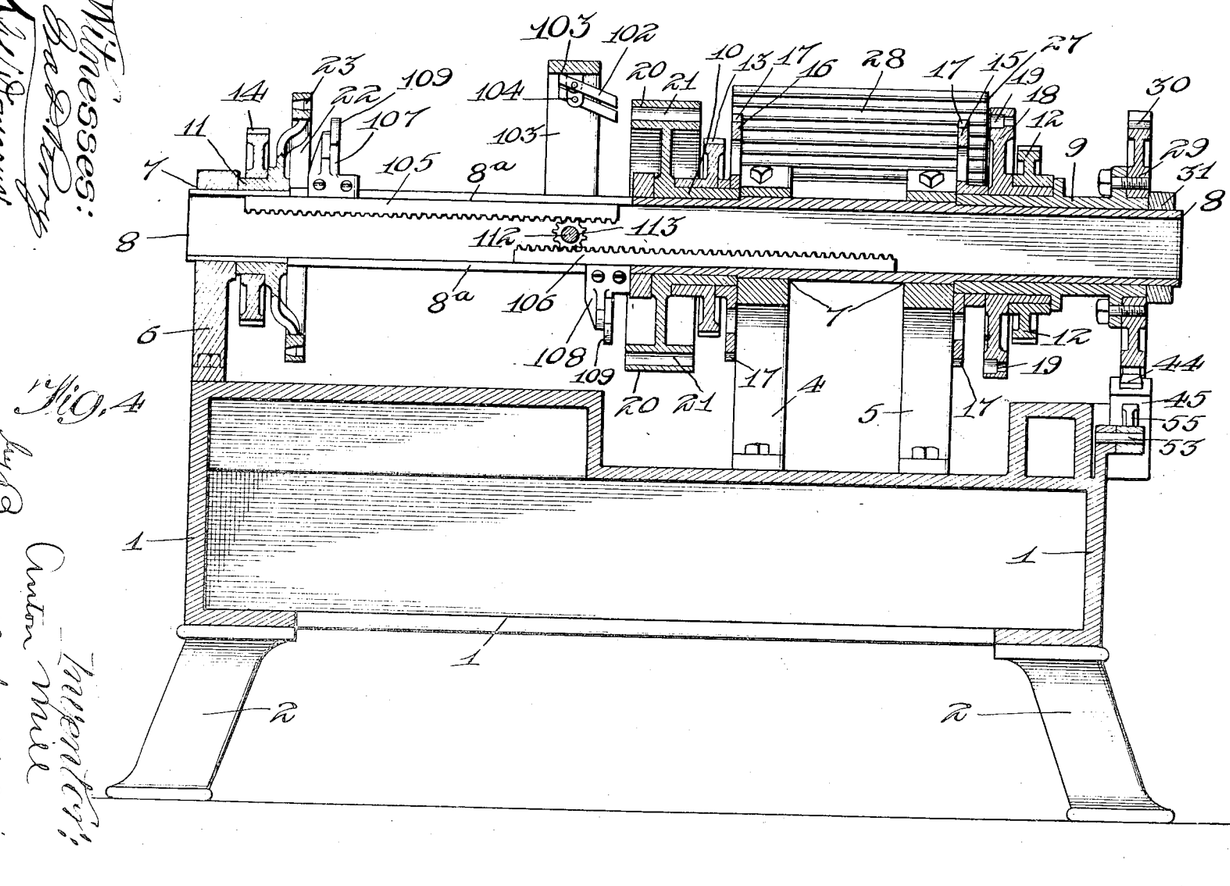
Fig. 4 is a longitudinal section on line $x$—$x$ of Fig. 1.
Figures 5, 11:
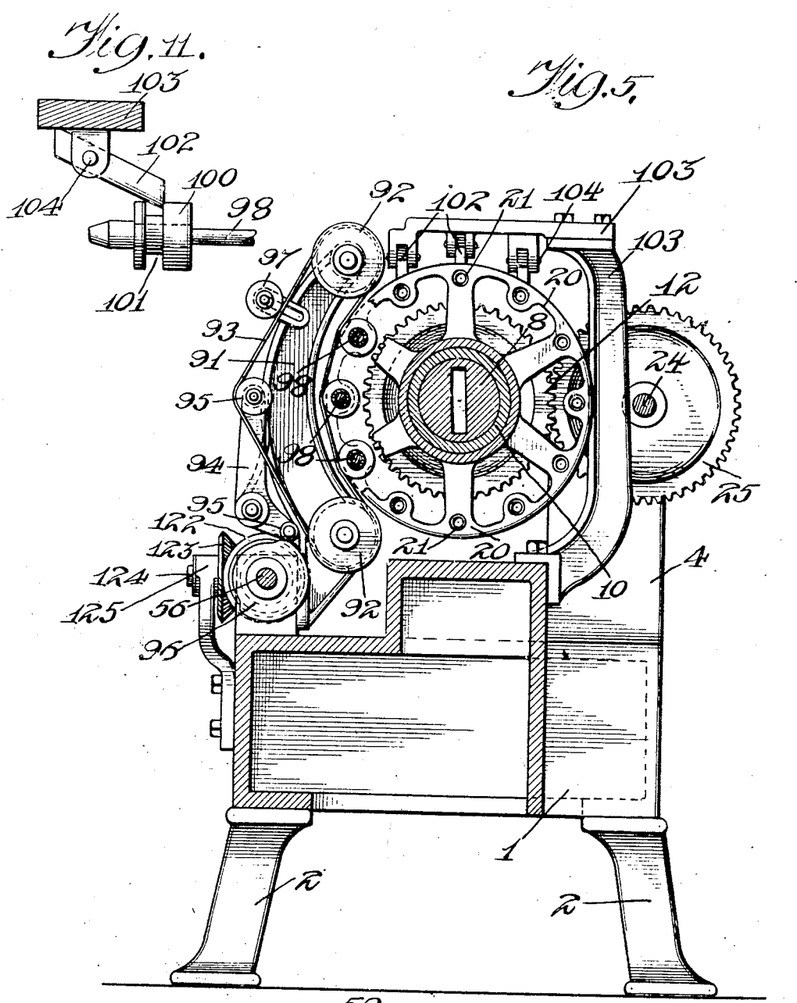
Fig. 5 is a sectional view on line $y$—$y$ of Fig. 2.
Fig. 11 is a detail of the mandrel locking device.
Figure 6:
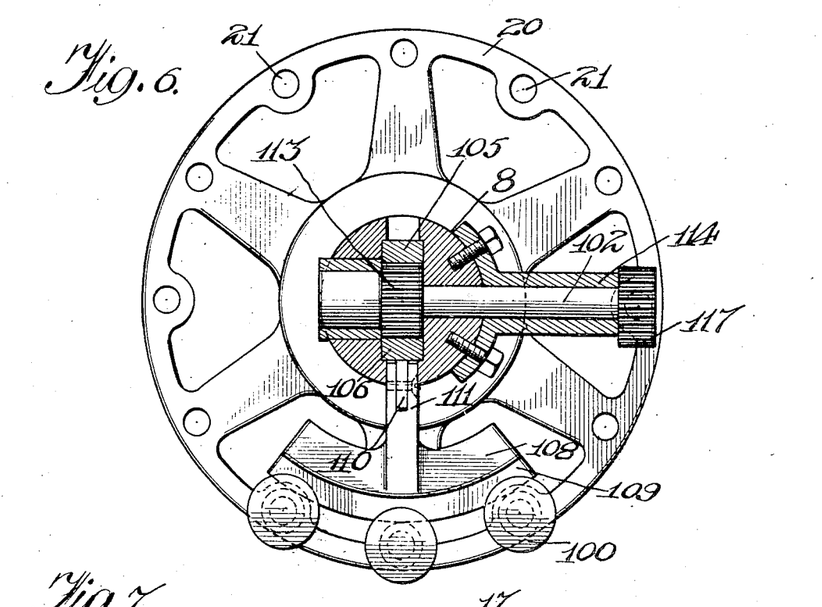
Fig. 6 is a section on line $z$—$z$ of Fig. 3.
Figure 7:
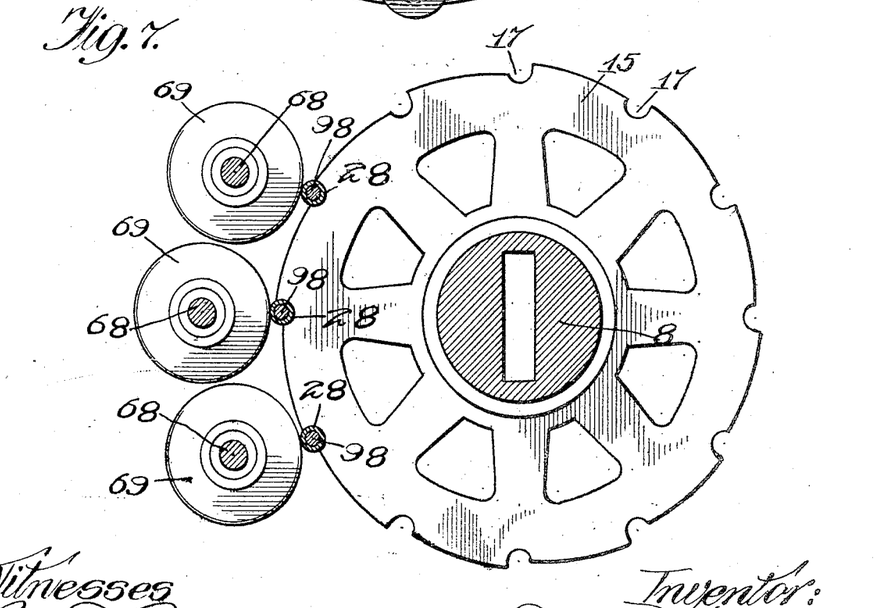
Fig. 7 is a detail view of one of the holding disks showing the tubes in position to be cut.
Figures 8, 9, 10:
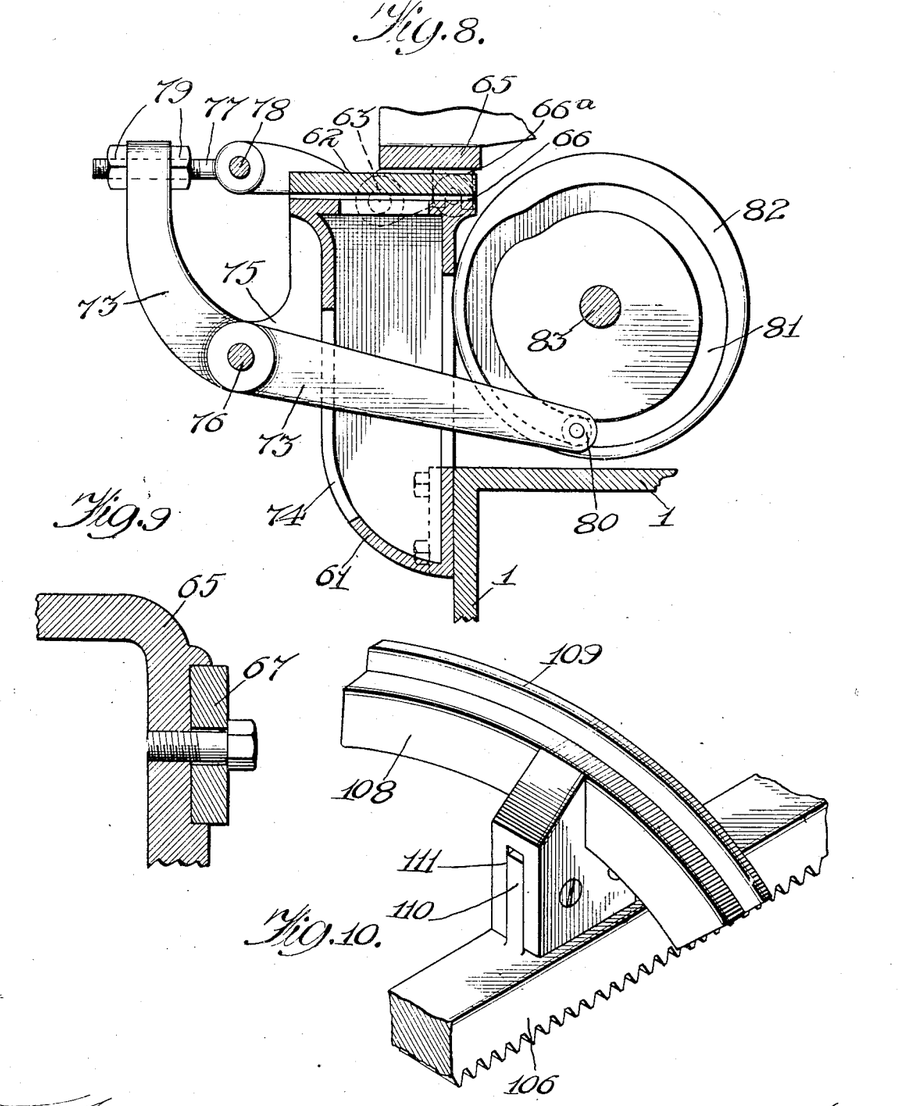
Fig. 8 is an enlarged detail of the cutter frame operating mechanism.
Fig. 9 a detail of the adjustable bearings carried by the cutter frame.
Fig. 10 is an enlarged detail view of one of the ejecting and inserting fingers.
Figures 12, 13, 14, 20:
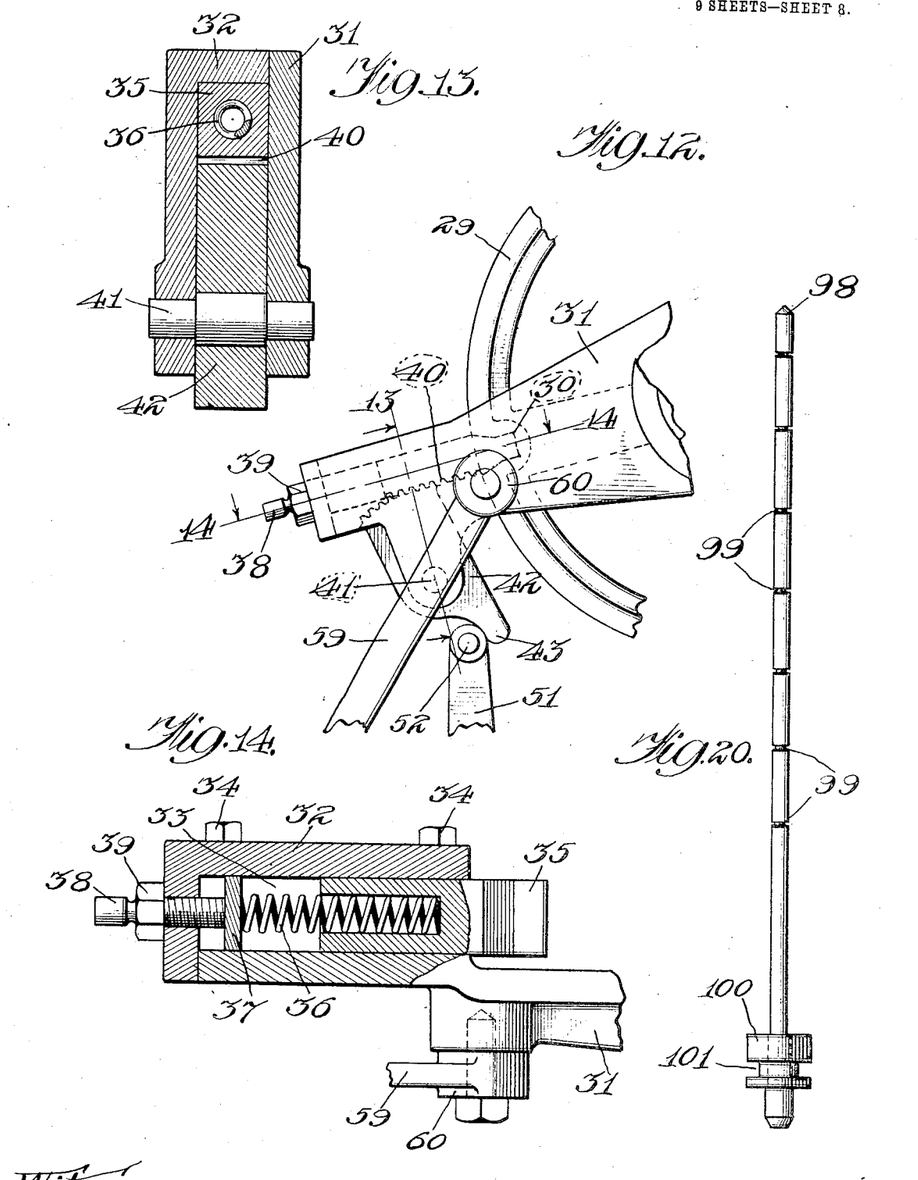
Figs. 12, 13 and 14 are enlarged detail and sectional views of the operating pawl.
Fig. 20 is a view of the tube mandrel.
Figure 15:
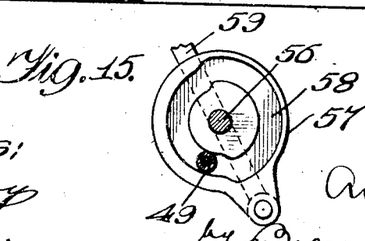
Fig. 15 is a detail of the operating pawl cam.
Figures 16, 17, 19:
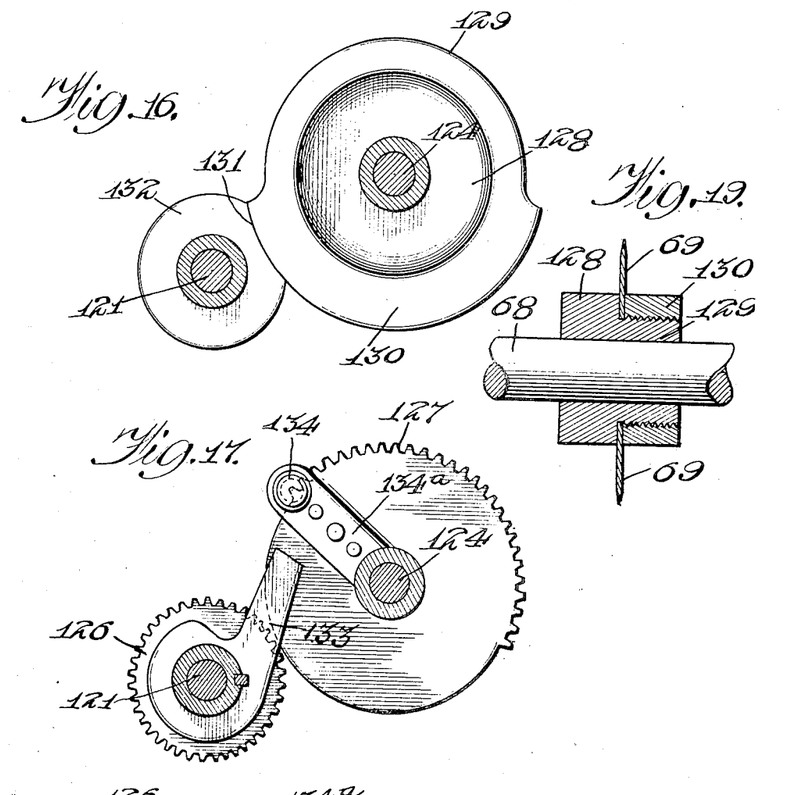
Fig. 16 is an enlarged detail of the locking cams.
Fig. 17 is an enlarged detail of the gears for operating the cams.
Fig. 19 is an enlarged detail section of the cutters.
Figure 18:
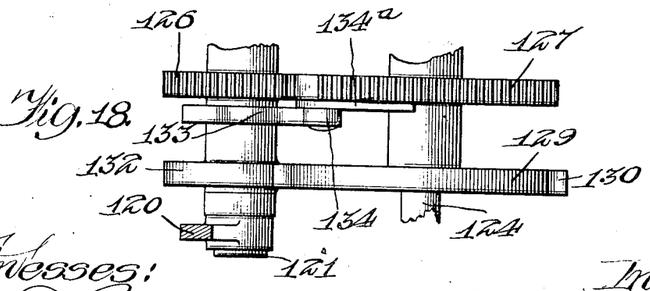
Fig. 18 is a top plan view of the assembled cams and gears.

Referring more particularly to the drawings, like reference characters designate similar parts throughout the several views. The numeral 1 indicates a base for the machine, supported by suitable legs or supports 2.

Secured to the base are standards 4, 5 and 6, and said standards are each provided in their upper ends with a bearing 7 in which is secured a hollow axle 8, preferably made in sections. Loosely journaled on the axle 8, adjacent to the standards 5 and 6, and preferably on the outside thereof, are sleeves or collars 9 and 10 and 11, and rigidly secured to these collars are gear wheels 12, 13 and 14; said gear wheels being of the same diameter and adapted to move in unison, as hereinafter set forth.

Carried by the inner end of the collars or sleeves 9 and 10 are plates or disks 15 and 16, of equal diameter, and said plates or disks are each provided with recesses or notches 17 in the periphery thereof, which are adapted to receive and hold the tubes to be cut, as hereinafter set forth.

Secured also to the collar or sleeve 9, and adjacent to the notched or recessed disk 15, is a retaining or holding disk 18, which is provided in its body portion, near its periphery, with a plurality of transverse cavities or sockets 19, and said sockets 19 are equal in number to the recesses or notches 17 of the disks or plates 15, and 16.

The disks 15 and 18 are both rigidly secured to the sleeve 9 in such a position that the notches or recesses 17 in the disk 15 register with the sockets or cavities 19 of the disk 18.

Carried by the sleeve 10 is a mandrel holder and guide 20 which is provided with a plurality of transverse apertures 21 through which the mandrels operate. These apertures 21 are equal in number to notches or recesses 17 of the disks 15 and 16 and one aperture is adapted to register with each of the notches or recesses 17 of the said disks 15 and 16. The mandrel holder being firmly secured in position so that the apertures therein always maintain the same relative position in relation to the recesses of the disk wheels 15 and 16, rigidly carried by the sleeve or collar 11 is a second retaining or holding disk 22, and said disk or member is also provided with a plurality of sockets or cavities 23, so arranged that they always stand in true alinement with the apertures 21 of the mandrel holder and carrier 20, the notches or recesses 17 of the disks 15 and 16 and the sockets or cavities 19 of the disk 18. This arrangement permits of the ready insertion and extraction of the mandrels into the tubes carried by the notches or recesses 17 of the disks 15 and 16, without interfering with or stopping the motion of the machine, as will be more fully set forth.

It will be seen that in order to accomplish the desired result the several disks and holders 15, 16, 18, 20 and 22 must move in unison and at the same rate of speed. For this purpose there is mounted in the framework of the machine, in suitable bearings and adjacent to the axle 8, a revolving shaft 24, which has secured thereto the gears 25, 26 and 27. These gears are of the same size and mesh with the gear wheels 12, 13, and 14, respectively, which are carried by the sleeves or collars 9, 10 and 11, loosely mounted on the axles 8.

Intermediate the gears 25 and 26 and secured to the shaft 24, adjacent the disks or wheels 15 and 16, is a drum 27 which is provided in its periphery with a plurality of pockets or receptacles 28, which are adapted to receive the tubes to be cut, from a hopper, and deliver them into the notches or recesses 17, as hereinafter set forth.

To the sleeve 9 and in any desired manner is secured a ratchet or operating wheel 29, and said wheel is provided in its periphery with a plurality of ratchet sockets 30, preferably four in number or of a number sufficient to give the disks or wheels 15 and 16 the desired number of revolutions necessary to complete the cutting and discharging operation.

An arm 31 is loosely journaled on the axle 8 adjacent the ratchet wheel 29 and extends beyond the periphery of said wheel. A plate 32, suitable in construction to form a housing 33, is secured to the end of the arm in any desired manner, but preferably by the bolts 34. Within this housing is a reciprocating ratchet pawl or tooth 35. Resting against this pawl, within the housing and in such a manner as to prevent displacement of the same is one end of a spring 36. The other end of said spring preferably engages a sliding plate 37, which is controlled by an adjusting screw 38 secured by the jam nut 39 for adjusting the tension of said spring. Said pawl is also provided with a rack or teeth 40 preferably located on one side thereof. Pivoted to the arm 31 by means of the pin or bearing 41 and in such a position as to engage the rack 40, is a segmental lever 42, which is provided with a reduced end or finger 43.

A retaining pawl 44, mounted in a housing 45, is secured to the framework adjacent to the rachet wheel 29 and out of the path of movement of the pawl 35, and said pawl is provided with a series of teeth or rack 46.

A lever 47, mounted in suitable bearings 48, is secured to the frame, and said lever is provided on one end with an anti-friction roller or projection 49, and on its other end with a rack or segment 50.

An arm 51 is carried by said lever and on the end of the arm is an anti-friction roller or projection 52, which is adapted to be engaged by the reduced end or finger 43 of the segment 42, as will be set forth. Intermediate the segmental end 50 of the lever 47 and the rack or toothed face of the retaining pawl 44 is pivoted, as at 53, in a bearing 54, a double segment 55 which is adapted to extract the pawl 44 from the sockets 30 of the ratchet wheel 29.

Journaled in the framework of the machine is a shaft 56. And carried by said shaft is a crank wheel 57 which is provided with a cam groove 58 adapted to receive the projection or roller 49 carried by the arm 51 of the lever 47, and secured to the crank wheel, is one end of a rod or bar 59, the other end 60 of which is connected to the arm 31 carrying the operating pawl 35 for transmitting motion to the same from the shaft 56.

Carried by the frame work is a bracket 61 and sliding on said bracket is a table or supporting plate 62. Pivoted to said plate or table as at 63 by means of the bolts or pins 64 is a framework 65, and 67 are a plurality of adjustable bearings carried by the framework. A lug or projection 66 is carried by the table or support 62 and said lug is adapted to be engaged by a recess or socket 66ᵃ carried by the pivoted frame 65 to prevent the frame from swinging too far forward.

Journaled transversely of the framework and in the bearings 67 are shafts 68 secured to which are saws or knives 69. On each of the cutter shafts 68 is a pulley 70 and mounted in the framework 65 at any desired position are idler pulleys 71. A belt 72 driven by any desirable means, preferably a counter shaft (not shown), is adapted to encircle the pulleys on the cutter shafts and idlers for transmitting a rotary motion to the saws or cutters 69 and for taking up the slack and causing the proper direction of rotation.

A lever 73 is pivoted in the bracket 61 which latter may be bifurcated as at 74 to form the necessary bearings 75 for the pin or bolt 76. One end of said lever is connected to the sliding plate of table 62 by means of the adjustable eyebolt or link 77 held in position by the pin 78 and jam nuts 79. The other end of the lever is provided with a projection or anti-friction pulley or roller 80, adapted to enter a cam groove 81 of the cam wheel 82 which is carried by the shaft 83 and driven by a gear wheel 84. A main driving shaft 85, carrying a driving pulley 86, and a gear 87, is mounted in suitable bearings 88. The gear 84, which is also carried by the shaft 83, meshes with a gear 90, carried by the shaft 56, the rotation of which, as will be seen, sets in motion the various cams carried by said shaft.

A bracket 91 is secured to the framework adjacent to the mandrel holder and guide 20, and mounted in said bracket are pulley wheels 92 preferably near the ends thereof, around which passes an endless belt 93. A lever 94 is pivoted to the bracket 91 and is provided at one end with a pulley 95 adapted to engage the belt 93 and with a projection or anti-friction roller 95, which is engaged and operated by a cam 96, carried by the shaft 56. A supplemental belt tightener 97 may be employed if desired.

Mounted in the mandrel guide and holder 20 are mandrels 98, which are provided in their bodies with a plurality of circumferential grooves 99, adapted to co-act with and receive the cutters or saws 69. Secured to the end of each of the mandrels adjacent to the belt 93 and in such a position as to be engaged and operated by the belt is a pulley 100. Each of these pulleys 100 is provided with a circumferential groove 101, which is adapted to be engaged by a dog or lever 102, pivoted to a support 103, as at 104, which support is carried by the framework. Sliding within the axle 8 are rack-bars 105 and 106, and carried by said bars are inserting and ejecting fingers or projections 107 and 108, which are adapted to extend through slots 8ª in said axle. These fingers are provided with a projecting rib 109 and are preferably constructed in the shape of a quadrant and may be adjustably and removably secured to the rack bars 105 and 106, as at 110 and 111.

A transverse shaft 112, journaled in the axle 8, is provided with a pinion 113, which engages the rack bars 105 and 106. If desired, a bracket 114 may be secured to the axle 8 to support the shaft 112 and allow the same to be extended the desired distance.

A toothed segment 115 is pivoted as at 116 to the framework or axle 8 in such a position as to engage and operate a second pinion 117, carried by the outer end of the shaft 112. Connected to and extending from the segment 115 is a rod or bar 118, the free end of which is connected to a pin 119, carried by a crank arm 120, mounted on a stub shaft 121.

Carried by the shaft 56 is a gear wheel 122 which meshes with a gear 123 on a transverse shaft 124 supported in suitable bearings 125. To the hub of the crank arm 120 is secured a gear wheel 126, and also carried by the shaft 124, is a sectional or mutilated gear 127, provided with teeth on one-half of its periphery only, the number of teeth corresponding to the number of teeth in the gear wheel 126. A disk wheel 128 is also carried by the shaft 124 and has a portion of its periphery cut away as at 129 to form a cam or extended surface 130. This cam surface is adapted to enter and coöperate with a recessed or cut away portion 131 of the disk 132, mounted on the crank arm hub 120, and serves as a means to lock the segment 115 during the interval in which the saws are cutting the tubes.

An arm or projection 133 is keyed to the crank arm hub 120 and is engaged and operated by a projection or anti-friction roller 134, which is mounted in and carried by an arm or projection 134ª, carried by the gear 127. This pin or projection 134ª stands directly in line with the pitch of the teeth of the gear 127 so as to give the gear 126 the same rate of circumference speed as the gear 127, before the gear teeth begin to mesh.

The saws 69 may be mounted on the shafts 68 in any desired manner but I have preferably shown a sleeve 128 keyed to the shaft and provided with a reduced screw threaded portion 129 which receives the saw, and 130 is a nut adapted to engage the threads and abut against the saws for holding them securely in position.

The operation of my machine briefly stated is as follows,—Before the machine is started the mandrels are inserted so that one end thereof will rest in the apertures 21 of the mandrel carrier or holder 20 and the other in the socket or cavity 23 of the disk 22. These being in position the tubes to be cut are fed in any desired manner into the pockets 28 in the drum 27. At this time motion being imparted to the cam plate 57 through the medium of the intermediate gears from the driving shaft 85 will cause the operating pawl 35 to be set in motion by means of the connecting bar or rod 59.

The pawl having engaged one of the notches 30 of the ratchet wheel 29 will advance the same one step, carrying the tubes which have been fed into the notches or recesses 17 of the disks 15 and 16 to the first position. The pawl will continue to move until the end 43 of the segmental lever 42 contacts with the roller on the end of the arm 51 of the lever 47. Just as the pawl reaches this position the cam 58 will cause the lever 47 to be rocked withdrawing the pawl 35 and through the medium of the double segment 55 seat the retaining pawl 44. Just as these tubes reach this position the shaft 56, by means of the gear 122 meshing with the gear 123, turns the shaft 124 which operates the segment 115 and this segment acting upon the pinion 117, carried by the shaft 112, will cause the pinion 113 to move the racks 106 and 105 in opposite directions, causing the finger 107, which engages the ends of the mandrels 98, to push said mandrels forward, through the mandrel carrying disk 20, into the tubes and to such a position that the ends thereof will pass into and be retained in the sockets or cavities 19 of the disk 18. On the end of each mandrel is a pulley with which a belt 93 engages, and is given motion from the pulley 131 in any desired manner.

Before the pulleys are brought into the path of the movement of the belt 93 the mandrels are locked into position by dogs or pawls 102 pivoted to a frame adjacent to the mandrel carrier. On the next step the mandrel pulleys are brought into contact with the belt 93 and as the shaft 56 causes the cam 96 to revolve it will contact with the projection or roller on the lever 94 and tighten the belt 93; this gives a continuous rotation to the mandrels carrying the tubes which by this operation have been brought into the proper position to be acted upon by the cutters.

Simultaneous with this movement the lever 73 will be operated through the medium of the cam groove 81 in the disk 82, which is carried by the shaft 83. This will advance the table or plate 62 upon which is mounted the rotating cutters 69 and cause them to engage the tubes. The mandrels and saws both rotating will cause the tubes to revolve and thereby cut them. After being cut, the saw frame is retracted by the continuous operation of the cam 81 and the machine will advance to the next step. As the mandrel holder advances to its final position, the rib 109 of the finger 108 will enter the grooves 101 in the pulleys 100. The segment 115 being set in operation will cause the pinion 113 to move the rack 106 back. This movement will withdraw the mandrels from the cut tubes and carry them back until their ends enter the sockets or cavities 23 of the disk 22. This will allow the sections of the tubes to drop down and roll out of the machine.

In order to produce an interval of rest during the operation so as to allow the knives to cut the tubes, and insure the proper extraction of the mandrels, I have provided a locking device consisting of locking cams 128 and 132, constructed to operate as follows: When the mutilated gear 127 begins to act it will cause the gear 126 to start to rotate the shaft 121 to operate the segment 115. The gear 127 is twice the diameter of the gear 126 and has on its half circumference nearly the same number of teeth as the entire gear 126, so that one half revolution of the gear 127 will cause a complete revolution of the gear 126. During the other half of the revolution it will be seen that the portion 130 of the disk 128 will enter the cut away portion 131 of the disk 132 and lock the latter against further movement until the arm 133 is engaged by the projection or roller 134 which will cause the same to operate and give the disk 132 the same rate of circumference speed as the portion 130 of the disk 128, before the teeth of the gear 127 engage the gear 126 to operate the same.

Having thus fully described my invention, I desire it understood that I do not wish to be limited to the exact construction, arrangement and operation of the several parts as various changes may be made without departing from the spirit of my invention.

Having thus fully described my invention, what I claim as new therein, and desire to secure by Letters Patent, is,—

1. In a tube cutting machine, a bodily movable mandrel holder and guide, and means for longitudinally shifting the position of the mandrels.

2. In a tube cutting machine, the combination of a bodily movable mandrel holder and guide, and means for automatically shifting the position of the mandrels in said guide.

3. In a tube cutting machine, the combination of a mandrel holder and guide, mandrel retainers coöperating with the holder and means for shifting the position of the mandrels in the guide to alternately engage the retainers.

4. In a tube cutting machine, the combination of a bodily movable mandrel holder and guide, tube supporters coöperating with the holder and means for inserting the mandrels in the tubes.

5. In a tube cutting machine, the combination of a bodily movable mandrel holder and guide, tube holders coöperating with the mandrel holder and means for automatically inserting the mandrels in the tubes.

6. In a tube cutting machine, the combination of a movable mandrel holder and guide, a tube holder coöperating with the mandrel holder, means for inserting and withdrawing the mandrels, and separate retainers for supporting the free ends of the mandrels.

7. In a tube cutting machine, the combination of a mandrel holder, tube holders coöperating with the mandrel holder, means for laterally moving the mandrels with respect to the holder for inserting the mandrels in the tubes, and means for preventing the lateral displacement of the mandrels.

8. In a tube cutting machine, the combination of a mandrel holder, tube holders coöperating with the mandrel holder, means for inserting the mandrels in the tubes, and a pawl within the path of the lateral movement of the mandrels to prevent displacement of the same.

9. In a tube cutting machine, the combination of a mandrel holder and mandrels mounted thereon, said mandrels being provided with a grooved end, fingers mounted adjacent to the holder, a rib extending from said fingers, means for rotating the holder to cause the rib to enter the grooves, and means for moving the fingers to shift the position of the mandrels.

10. In a tube cutting machine, the combination of a mandrel holder, tube holders coöperating with the mandrel holder, rack bars adjacent to the mandrel holder, fingers carried by the bars, and a pinion engaging the racks for causing the fingers to insert and withdraw the mandrels.

11. In a tube cutting machine, the combination of a mandrel holder, tube holders coöperating with the mandrel holder, rack bars adjacent to the mandrel holder, fingers carried by the bars, a pinion engaging the racks for causing the fingers to insert and withdraw the mandrels, and retainers for supporting the free ends of the mandrels in both operative and inoperative positions.

12. In a tube cutting machine, the combination of a mandrel holder, tube holders coöperating with the mandrel holder, rack bars adjacent to the mandrel holder, fingers carried by the bars, a pinion engaging the racks for causing the fingers to insert and withdraw the mandrels, retainers for alternately supporting the free ends of the mandrels, gears carried by the mandrel holder, retainers, and tube holders, and means for driving said gears to operate the holders and retainer in unison.

13. In a tube cutting machine, the combination of a hollow axle, a mandrel holder revolving on said axle, tube holders coöperating with the mandrel holder, and means for operating the holders, racks sliding within the axle, means connected with the racks to cause the insertion and withdrawal of the mandrels, and means for operating the racks.

14. In a tube cutting machine, the combination of a mandrel holder and guide, tube supports coöperating with the holder, racks adjacent to the holder, an axle, pinions carried by the axle, one of said pinions engaging the racks, a pivoted segment, engaging the other pinion and means for operating the segment to shift the mandrels.

15. In a tube cutting machine, the combination of a mandrel holder and guide, tube supports coöperating with the holder, racks adjacent to the holder, a shaft, pinions carried thereby, one of said pinions engaging the racks, a pivoted segment engaging the other pinion and means for intermittently operating the segment to shift the mandrels.

16. In a tube cutting machine, the combination of a mandrel holder and guide, tube supports coöperating with the holder, racks adjacent to the holder, a shaft, pinions carried thereby, one of said pinions engaging the racks, a pivoted segment engaging the other pinion, means for operating the segment to shift the mandrels, and means for locking the segment.

17. In a tube cutting machine, the combination of a mandrel holder and guide, tube supports, mandrel shifting fingers, and means for moving the fingers, a pair of shafts, disks carried by the shafts, one of said disks being of a larger diameter than the other, a portion of the periphery of the larger disk being extended, a cutaway portion in the periphery of the smaller disk, adapted to receive the extended portion of the larger disk, means for transmitting motion to the disks, and a connection between the smaller disk and the finger operating mechanism.

18. In a tube cutting machine, the combination of a mandrel holder, tube supporters, mandrel shifting fingers, and means for moving the fingers, a pair of shafts, disks carried by the shafts, one of said disks being of a larger diameter than the other, an extended portion on the periphery of the larger disk, a recess in the smaller disk adapted to receive the extended portion, a gear and arm carried by the smaller disk shaft, a mutilated gear carried by the larger disk shaft, and engaging the smaller gear, a projection carried by the larger gear and adapted to engage the arm, means for operating the gears and means for transmitting motion from the smaller disk shaft to the finger operating mechanism.

19. In a tube cutting machine, the combination of a mandrel holder, tube supporters, coöperating with the holder, and means for simultaneously moving the holder and supporters, a ratchet connected to one of the holders, a pivoted arm, an operating pawl carried by the arm, and adapted to engage the ratchet, a retaining pawl, and means for moving the operating pawl to cause the intermittent rotation of the holders.

20. In a tube cutting machine, the combination of a mandrel holder, tube supporters coöperating with the holders, and means for simultaneously rotating the holders, a ratchet carried by one of the holders, an arm, an operating pawl carried by the arm, a retaining pawl, means for transmitting motion to the arm to cause an intermittent rotation of the holders, and means for positively extracting the operating pawl and seating the retaining pawl.

21. In a tube cutting machine, the combination of a mandrel and tube holder, and means for simultaneously operating the same, a ratchet, a pivoted arm, an operating pawl carried thereby, and a retaining pawl, both adapted to engage the ratchet, and means for transmitting intermittent motion to the arm, teeth carried by the pawls, segments engaging the teeth, a pivoted lever adjacent to the segments, one end of said lever engaging the retaining pawl segment, an arm carried by the lever and adapted to engage the operating pawl segment, and means for transmitting motion to the lever to operate the segments for withdrawing and seating the operating and retaining pawls.

22. In a tube cutting machine, the combination of a mandrel and a tube holder, a ratchet connected to one of the holders, an arm, an operating pawl carried thereby, a retaining pawl, means for transmitting motion to the arm to intermittently rotate the holders, racks carried by the pawls, a segment engaging the operating pawl rack, a double segment engaging the retaining pawl rack, a pivoted lever, a rack carried by one end thereof and engaging the double segment, an arm carried by the lever and standing in the path of movement of the operating pawl segment, and means for operating the lever when the operating pawl segment engages the arm thereof, to extract said pawl and seat the retaining pawl.

23. In a tube cutting machine, the combination of means for supporting the tubes and means for intermittently advancing the supporter, a reciprocating carriage, a frame pivoted to the carriage, a stop carried by the carriage to limit the forward movement of the frame, cutters journaled in the frame, means for rotating the cutters and means for advancing the carriage.

24. In tube cutting machine, the combination of means for supporting the tubes, and means for intermittently advancing the supports, a reciprocating pivoted frame, shafts journaled in said frame, cutters carried by the shafts, pulleys mounted on the shafts, a belt engaging said pulleys for transmitting motion to the shafts, a pivoted lever, connected to the frame, and means for intermittently operating the lever to move the frame.

25. In a tube cutting machine, the combination of means for supporting the tubes and means for intermittently advancing the supports, a reciprocating pivoted frame, rotating cutters journaled in the frame, a pivoted lever, an adjustable link connecting one end of the lever with the frame, a cam engaging the other end of the lever and means for rotating the cam to move the frame.

26. In a tube cutting machine, the combination of means for supporting the tubes and means for intermittently advancing the supports, a reciprocating frame, adjustable bearings carried by the frame, cutter shafts mounted in the bearings, pulleys carried by the shafts, idle pulleys carried by the frame, a belt engaging the pulleys and means for moving the frame.

27. In a tube cutting machine, the combination of a carrier, mandrels mounted in said carrier and provided on their extremities with pulleys, a bracket, pulleys carried by the bracket, means for driving one of the pulleys, an endless belt carried by the pulleys and in the path of movement of the mandrel pulleys, means for advancing the mandrels and means for tightening the belt when the mandrel pulleys contact with the same.

28. In a tube cutting machine, the combination of an intermittently operated carrier, mandrels mounted in said carrier and provided on their extremities with pulleys, a bracket, pulleys carried by the bracket, means for driving one of the pulleys, a belt engaging the pulleys, and within the path of movement of the mandrel pulleys, and means for tightening the belt to transmit motion to the mandrels.

29. In a tube cutting machine, the combination of an intermittently operated carrier, mandrels mounted in said carrier, pulleys carried by the mandrels, a bracket, pulleys mounted thereon, and means for driving one of said pulleys, an endless belt encircling said pulleys, and in the path of movement of the mandrel pulleys, means for driving one of the pulleys, a lever pivoted to the bracket, a pulley carried by one end of the lever and adapted to engage the belt, a cam engaging the other end of the lever and means for operating the cam to tighten the belt.

30. In a tube cutting machine, the combination of a mandrel holder and guide, a tube holder coöperating with the mandrel holders, means for inserting and withdrawing the mandrels, and means for locking the said inserting and withdrawing means.

31. In a tube cutting machine, a combined rotatable mandrel holder and guide, means for rotating the same, and means for longitudinally shifting the mandrels through the said holder and guide.

32. In a tube cutting machine, the combination of a mandrel holder and guide, a mandrel retainer on each side of the holder and coöperating therewith, and means for shifting the mandrel through the holder and guide to alternately engage the retainers.

33. In a tube cutting machine, the combination of a rotatable mandrel holder and guide, a rotatable tube holder coöperating with the mandrel holder and guide, means for shifting the mandrel through the holder and guide, and inserting the same into the adjacent tube on the holder, and means for rotating said mandrel and tube holders.

34. In a tube cutting machine, the combination of a rotatable mandrel holder and guide, a retainer for the end of the mandrel spaced from the holder and guide and coöperating therewith, a rotatable tube holder located between the mandrel holder and guide and the retainer, means for shifting the mandrel through its holder, and the adjacent tube in the tube holder to cause the end of the mandrel to engage the retainer, and means for operating all of said parts.

35. In a tube cutting machine, the combination of a bodily movable mandrel holder and guide, a bodily movable tube support adapted to position the tubes to receive the mandrels, and means for longitudinally shifting the mandrels for inserting them in the tubes.

36. In a tube cutting machine, the combination of a bodily movable mandrel holder and guide, a bodily movable tube support adapted to position the tubes to receive the mandrels, means for shifting the mandrels for inserting them in the tubes, means for longitudinally moving the mandrels for withdrawing them from the tubes, and means for holding the mandrels against said longitudinal movement.

37. In a tube cutting machine, the combination of a bodily movable mandrel holder and guide, a bodily movable tube support adapted to position the tubes to receive the mandrels, means for shifting the mandrels for inserting them in the tubes, means for longitudinally moving the mandrels for withdrawing them from the tubes, and means stationary with relation to the mandrel holder for holding the mandrels against said longitudinal movement.

38. In a tube cutting machine, the combination of a bodily movable mandrel holder and guide, a bodily movable tube support adapted to position the tubes to receive the mandrels, means for shifting the mandrels for inserting them in the tubes, means for longitudinally moving the mandrels for withdrawing them from the tubes, and means for preventing said longitudinal movement of the mandrels during a portion only of their bodily movement.

39. In a tube cutting machine, the combination of a bodily movable mandrel holder and guide, means for longitudinally shifting the position of the mandrels, and means for preventing longitudinal movement of the mandrel during a portion only of its bodily movement.

40. In a tube cutting machine, the combination of a bodily movable mandrel holder and guide, means for positioning the tubes to receive the mandrels, means for inserting the mandrels in the tubes, means for longitudinally shifting the mandrels to withdraw them from the tubes, and means for preventing longitudinal movement of the mandrels during a portion of their bodily movement.

41. In a tube cutting machine, the combination of a bodily movable mandrel holder and guide, means for positioning the tubes to receive the mandrels, means for longitudinally shifting the position of the mandrel for inserting them in the tubes, and means for preventing longitudinal movement of the mandrel during a portion only of their bodily movement.

42 In a tube cutting machine, the combination of an intermittently rotatable mandrel holder, means for inserting the mandrels in the tubes, means for temporarily locking the holder against rotation, a cutter, and means for causing the cutter to engage an uncut tube on one of the mandrels while the holder is locked against movement.

In testimony whereof I have signed my name to this specification, in the presence of two subscribing witnesses, on this 19th day of September A. D. 1905.

ANTON MILL.

Witnesses:
  ALFRED HERHOLZ,
  PHILIP RENNER.